Jan. 17, 1939.  V. W. KLIESRATH  2,143,950
WHEEL
Filed March 29, 1935    2 Sheets-Sheet 1

INVENTOR.
VICTOR W. KLIESRATH
BY McConkey & Booth
ATTORNEY.

Jan. 17, 1939. V. W. KLIESRATH 2,143,950
WHEEL
Filed March 29, 1935 2 Sheets-Sheet 2
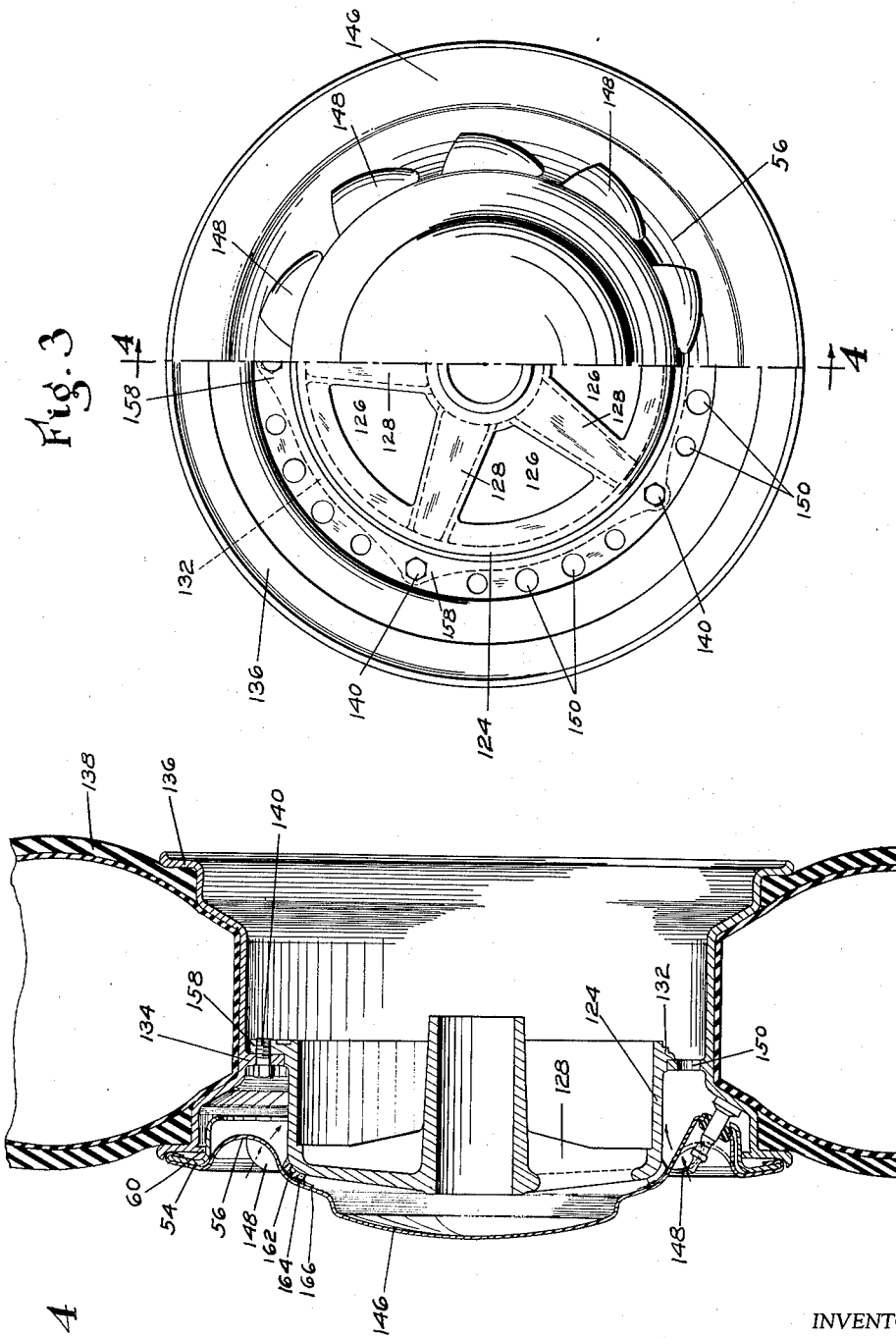
INVENTOR.
VICTOR W. KLIESRATH
BY
McConkey & Booth
ATTORNEY.

Patented Jan. 17, 1939

2,143,950

UNITED STATES PATENT OFFICE 2,143,950

WHEEL

Victor W. Kliesrath, South Bend, Ind., assignor, by mesne assignments, to International Engineering Corporation, Chicago, Ill., a corporation of Illinois Application March 29, 1935, Serial No. 13,635

16 Claims. (Cl. 301—6)

This invention relates to wheels, and is illustrated as embodied in the road wheel of an automobile.

An object of the invention is to provide simple and inexpensive means for circulating air through such a wheel, this being especially desirable where the air can be thereby drawn in a cooling stream across a brake drum forming a part of the wheel assembly.

In the preferred embodiment, the desired air circulation is secured by means carried by, and illustrated as parts such as louvers formed integrally of, a cover disk for the wheel. This disk is shown detachably secured to the wheel rim, and may if desired have a form such as to streamline the wheel assembly.

I prefer to provide the cover disk with means, such as annular integral bead, sealing against the head of the brake drum adjacent its periphery, whereby I am enabled (without leaving the brake in any way exposed) to provide one or more openings in the head of the drum through which the brake is fully accessible when the cover disk is removed.

In the illustrated wheel, the rim has an internal rib engaging and bolted or otherwise secured to an external rib formed on the brake drum, so that the drum forms the body of the wheel, and registering openings in the two ribs permit the described circulation of cooling air crosswise of the drum.

The above and other objects and features of the invention, including various novel combinations of parts and desirable particular constructions, will be apparent from the following description of the illustrative embodiment shown in the accompanying drawings, in which:

Figure 3 is a side elevation of an alternative embodiment of my invention, the right half being with cover disk in place and the left half being with the cover disk removed, the wheel being shown without the tire; and Figure 4 is a section on the line 4—4 of Figure 3 but including the tire.

Figures 1, 2:
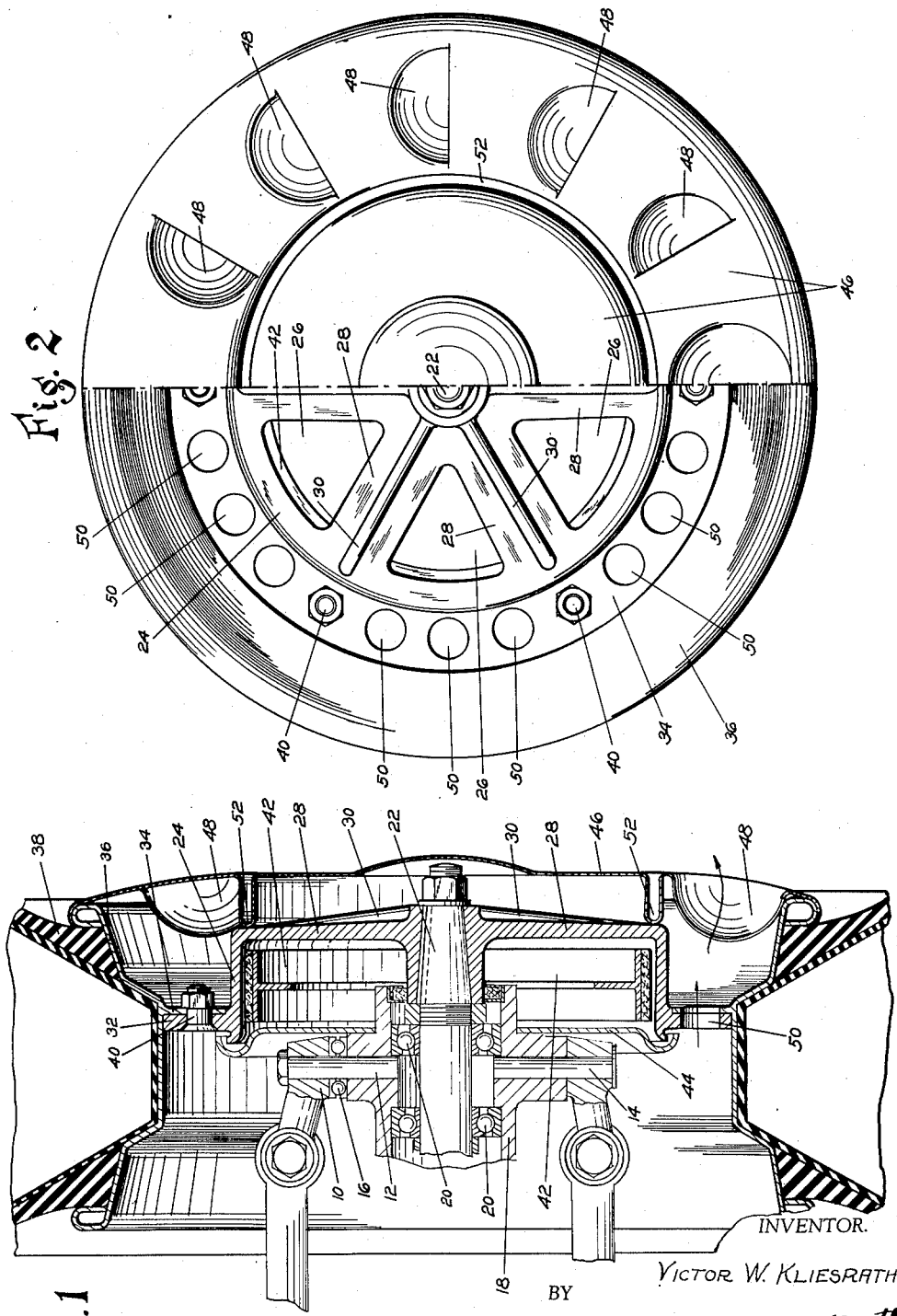
Figure 1 is a central vertical transverse section through the wheel and associated parts.
Figure 2 is a side elevation thereof, the right half being with the cover disk in place and the left half being with the cover disk removed, the wheel being shown without the tire.

The illustrated wheel assembly includes a bowed rigid vertically-extending supporting member or knuckle 10, fully described in my prior applications Nos. 686,722, filed August 25, 1933, and 651,821, filed January 14, 1933, to which is connected, as by coaxial pivots 12 and 14 a thrust bearing 16, a hub 18. The hub 18 is shown provided with anti-friction bearings 20, in which there is rotatably mounted a spindle 22 carrying rigidly secured at its end a brake drum 24.

In this particular illustrative embodiment, the brake drum 24 in effect forms the body of the wheel. It is shown with openings 26 in its head, affording ready access to the inside of the drum and in effect defining spokes 28 shown reinforced by ribs 30. The drum is shown with its braking flange formed with an external rib 32, to which is bolted or otherwise secured a corresponding internal rib 34 integral with or rigidly welded to a rim 36 (shown as a drop center rim) carrying a tire 38 of any desired type. The attaching bolts utilized in this particular wheel are shown at 40.

The brake associated with drum 24 may include shoes or equivalent friction means 42, operated in any desired manner, which are arranged inside of the drum and which are mounted in any desired manner on a backing plate or the like 44 which forms a closure for the open side of the brake drum and which is secured rigidly to the hub 18.

In the illustrated embodiment of the present invention, the wheel assembly is provided on its outer side with a novel cover disk 46, made of sheet steel by stamping and pressing operations, and which is so formed as to streamline the wheel assembly. This disk differs from those shown in the above-identified prior applications principally in that it is provided with air-circulating means, such as an annular series of louvers 48 pressed integrally therefrom adjacent its periphery, and which draw streams of cooling air across the drum 24 between the drum and the rim 36, through registering openings 50 in the two ribs 32 and 34.

If the openings 26 are provided in the head of the brake drum, as I prefer, according to another feature of the invention the disk 46 is provided with means, such as an integral annular bead 52, sealing against the head of the brake drum adjacent its periphery, outside of the openings 26. The illustrated bead 52 is a channel-section annular rib formed integrally of the disk.

This bead or its equivalent, by sealing around the outside of the openings 26, insures that no dirt or water will get into the brake from openings 50 or louvers 48.

The disk 46 may conveniently be held in place by securing it to the rim 36, and is shown with a peripheral flange which snaps frictionally over the edge of the rim.

An alternative construction is shown in Figures 3 and 4 in which parts corresponding to those in Figures 1 and 2 are identified by the same numeral plus 100.

The body of the wheel consists of a brake drum 124 connected integrally to a hub by a plurality of channel-shaped spokes 128 arranged radially about the hub and with spaces 126 between the spokes providing ready access to the brake (not shown) within the drum when the cover plate is removed. At the inner edge of the drum is an external rib 132 formed with a plurality of lugs 158, equally spaced about the circumference, to which the rim 136 carrying any suitable tire is fastened by bolts 140 passing through the internal rib 134 which is integral with or securely welded to the rim 136.

A novel cover plate of formed sheet steel or other suitable material covers the outside of the wheel and rim and is held in place by the annular ring 54. As shown the periphery of the cover plate is rolled around the flange of the ring 54. The body of the ring is pushed into the opening defined by a second internal rib 60 formed on or welded to the rim 136 and the whole is held in place by friction or by suitable spring clips (not shown) whereby it may be removed or replaced with facility. As in the first embodiment described, this plate is provided with novel air circulating means consisting of several louvers 148 formed on the inner surface of a semi-toroidal, annular groove 56, of greater diameter than the brake drum and formed in the plate 146. By this construction the louvers are so placed that cooling air is drawn from outside the wheel inwardly and centripetally so that it impinges upon and sweeps across the outer surface of the brake drum 124 with a consequent increase in cooling effectiveness over that provided by mere circulation of air. The air thus drawn into the wheel escapes inwardly through the ventilating holes 150 in the rib 134.

Entrance of dirt and moisture into the brake drum from the inside is prevented by the usual backing plate (not shown) and because of the openings 126 in the outside of the brake drum, a sealing means is provided for the purpose of preventing similar entrance, by means of the louvers and said openings 126, of dirt and moisture from the outside of said wheel. This seal comprises an annular felt or rubber ring or packing of compressible material 162 glued or vulcanized or otherwise fastened to a metal ring 164. This ring is formed to fit closely against the inner surface of the cover plate and it and the attached felt are held in place on the cover plate by metal clips 166 spotwelded or otherwise secured to the plate. The seal is of such diameter that when the cover plate is put in place the seal is compressed against the outer corner of the barrel of the brake drum, thus interposing an effective seal between louvers 148 and openings 126.

While two illustrative embodiments have been described in detail, it is not my intention to limit the scope of my invention to these particular embodiments, or otherwise than by the terms of the appended claims.

I claim:

1. A wheel comprising a brake drum and a rim annularly spaced outwardly of said drum and rim-supporting means formed to permit the circulation of air across said drum, in combination with a cover disk having means sealing annularly against the head of the drum adjacent the periphery of the drum and having air-circulating means arranged radially outside of the sealing means, said drum having its head formed with an opening affording access to the interior of the drum when the disk is removed and which opening is closed by the disk and sealing means when the disk is in place, said disk being peripherally secured to said rim.

2. A wheel comprising a brake drum and a rim annularly spaced outwardly of said drum and rim-supporting means formed to permit the circulation of air across said drum, in combination with a cover disk having means sealing annularly against the head of the drum adjacent the periphery of the drum and having air-circulating louvers formed therein integrally of the metal of the disk and arranged in an annular series radially outside of the sealing means, said drum having its head formed with an opening affording access to the interior of the drum when the disk is removed and which opening is closed by the disk and sealing means when the disk is in place, said disk being peripherally secured to said rim.

3. A wheel comprising a brake drum and a rim annularly spaced outwardly of said drum and rim-supporting means formed to permit the circulation of air across said drum, in combination with a cover disk having means sealing annularly against the head of the drum adjacent the periphery of the drum and having air-circulating means arranged radially outside of the sealing means, said drum having its head formed with an opening affording access to the interior of the drum when the disk is removed and which opening is closed by the disk and sealing means when the disk is in place.

4. A wheel comprising a brake drum and a rim annularly spaced outwardly of said drum and rim-supporting means formed to permit the circulation of air across said drum, in combination with a cover disk having means sealing annularly against the head of the drum adjacent the periphery of the drum and having air-circulating louvers formed therein integrally of the metal of the disk and arranged in an annular series radially outside of the sealing means, said drum having its head formed with an opening affording access to the interior of the drum when the disk is removed and which opening is closed by the disk and sealing means when the disk is in place.

5. A wheel comprising a brake drum and a rim annularly spaced outwardly of said drum and rim-supporting means formed to permit the circulation of air across said drum, in combination with a cover disk secured to the rim adjacent its periphery and extending completely across the wheel and having a circular bead sealing against the head of the drum adjacent the periphery of the drum and provided with air-circulating means between the bead and the rim.

6. A wheel comprising a brake drum and a rim annularly spaced outwardly of said drum and rim-supporting means formed to permit the circulation of air across said drum, in combination with a cover disk having a circular bead sealing against the head of the drum adjacent the periphery of the drum and formed with air-circulating louvers between the bead and the rim, said drum having an opening in its head closed by the part of the disk within said bead and affording access to the interior of the drum when the disk is removed.

7. A wheel comprising a brake drum and a rim annularly spaced outwardly of said drum and rim-supporting means formed to permit the circulation of air across said drum, in combination with a cover disk having a circular bead sealing against the head of the drum adjacent the periphery of the drum and provided with air-circulating means between the bead and the rim, said drum having an opening in its head closed by the part of the disk within said bead and affording access to the interior of the drum when the disk is removed.

8. A wheel comprising a brake drum having an opening in its head and provided with an external rib, a rim having an internal rib secured to the rib on the drum, said ribs having registering openings therethrough, and a cover disk having means sealing against the head of the drum outside of the opening therein and having air-circulating means between the sealing means and the periphery of the disk.

9. A wheel comprising a brake drum having an opening in its head and provided with an external rib, a rim having an internal rib secured to the rib on the drum, said ribs having registering openings therethrough, and a cover disk having a bead sealing against the head of the drum outside of the opening therein and having air-circulating louvers between the sealing bead and the periphery of the disk.

10. A wheel comprising a brake drum having an opening in its head and provided with an external rib, a rim having an internal rib secured to the rib on the drum, said ribs having registering openings therethrough, and a cover disk having means sealing against the head of the drum outside of the opening therein and having air-circulating means between the sealing means and the periphery of the disk, said disk being detachably secured at its periphery to said rim.

11. A wheel comprising a brake drum having an opening in its head and provided with an external rib, a rim having an internal rib secured to the rib on the drum, said ribs having registering openings therethrough, and a cover disk having a bead sealing against the head of the drum outside of the opening therein and having air-circulating louvers between the sealing bead and the periphery of the disk, said disk being detachably secured at its periphery to said rim.

12. A wheel comprising a brake drum and a rim annularly spaced outwardly of said drum and rim supporting means formed to permit the circulation of air across said drum, in combination with a cover disk having an annular ring of compressible material sealing against the head of the drum adjacent the periphery of the drum and formed with air-circulating louvers between the sealing material and the rim, said drum having an opening in its head closed by the part of the disk within said head and affording access to the interior of the drum when the disk is removed.

13. A wheel having a brake drum, a wheel cover disk having a semi-torroidal annular groove near its periphery outside the circumference of said drum, air-circulating louvers formed in the radially inward side of said groove at an angle to the wheel plane, so that air is moved inwardly axially and centripetally and impinges directly upon and sweeps across the outer surface of said brake drum.

14. A cover disk for a wheel having a brake drum and a rim spaced outwardly of the drum with space therebetween for the circulation of air, said disk having means at its periphery for engagement with the rim and formed with a circular channel section sealing bead pressed therein, said bead being of substantially smaller diameter than the disk and adapted to seal against the brake drum adjacent the periphery thereof, said disk being formed with air circulating louvers between the bead and the periphery of the disk to circulate air over the brake drum.

15. A wheel comprising a brake drum having a central hub having a head extending radially outward therefrom and formed with an opening affording access to the interior of the drum from outside the drum and which has a braking flange encircling and supported by said parts, non-rotatable means closing the side of the drum opposite said head, a rim supported on said flange, and a closure disk extending across the wheel outside the drum head and provided with an annular seal engaging and encircling said head.

16. A wheel comprising a brake drum having a central hub having a head extending radially outward therefrom and formed with an opening affording access to the interior of the drum from outside the drum and which has a braking flange encircling and supported by said parts, non-rotatable means closing the side of the drum opposite said head, a rim supported on said flange, and a closure disk extending across the wheel outside the drum head and provided with an annular seal engaging and encircling said head, said disk having air circulating means radially beyond said seal and circulating air between the rim and said flange.

VICTOR W. KLIESRATH.